United States Patent
Muramoto et al.

(10) Patent No.: US 9,382,894 B2
(45) Date of Patent: Jul. 5, 2016

(54) HIGH-FREQUENCY DISCHARGE IGNITION APPARATUS

(71) Applicant: Mitsubishi Electric Corporation, Chiyoda-ku, Tokyo (JP)

(72) Inventors: Yuichi Muramoto, Chiyoda-ku (JP); Kimihiko Tanaya, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 241 days.

(21) Appl. No.: 14/152,022

(22) Filed: Jan. 10, 2014

(65) Prior Publication Data

US 2015/0108914 A1  Apr. 23, 2015

(30) Foreign Application Priority Data

Oct. 18, 2013  (JP) .................................. 2013-216943

(51) Int. Cl.
  *F02P 15/00* (2006.01)
  *F02P 15/10* (2006.01)
  *F02P 15/12* (2006.01)
  *F02P 9/00* (2006.01)
  (Continued)

(52) U.S. Cl.
  CPC . *F02P 15/00* (2013.01); *F02P 3/01* (2013.01); *F02P 9/002* (2013.01); *F02P 9/007* (2013.01); *F02P 15/10* (2013.01); *F02P 15/12* (2013.01); *F02P 23/04* (2013.01); *H05H 1/52* (2013.01); *H02M 2007/4815* (2013.01); *H05H 2001/4682* (2013.01); *Y02B 70/1441* (2013.01)

(58) Field of Classification Search
  CPC ............ F02P 15/10; F02P 15/12; F02P 9/002

USPC .................................................. 123/606, 607
See application file for complete search history.

(56) References Cited

U.S. PATENT DOCUMENTS

| 4,398,526 A * | 8/1983 | Hamai ..................... F02P 9/007 123/143 B |
| 4,766,855 A * | 8/1988 | Tozzi ....................... F02P 9/007 123/143 B |

(Continued)

FOREIGN PATENT DOCUMENTS

| JP | 2012-112310 A | 6/2012 |
| JP | 2012219766 A | 11/2012 |
| JP | 2013160216 A | 8/2013 |

OTHER PUBLICATIONS

Communication dated Jul. 21, 2014, issued by the German Patent and Trademark Office in counterpart German Application No. 10 2014 202 520.6.

(Continued)

*Primary Examiner* — Erick Solis
(74) *Attorney, Agent, or Firm* — Sughrue Mion, PLLC

(57) ABSTRACT

A high-frequency discharge ignition apparatus is obtained that can stably make a high-frequency current flow into a spark discharge path and efficiently forms large discharge plasma. The high-frequency discharge ignition apparatus is configured with an ignition plug, a spark discharge path generation device that generates a high voltage and supplies the generated high voltage to the ignition plug so as to form a spark discharge path in the gap of the ignition plug, a voltage boosting device that boosts the voltage of an AC current, and a high-frequency current supply apparatus that supplies an AC current to the spark discharge path formed in the gap by way of the voltage boosting device.

6 Claims, 3 Drawing Sheets

(51) Int. Cl.
  *F02P 3/01* (2006.01)
  *F02P 23/04* (2006.01)
  *H05H 1/52* (2006.01)
  *H05H 1/46* (2006.01)
  *H02M 7/48* (2007.01)

(56) References Cited

U.S. PATENT DOCUMENTS 5,456,241 A * 10/1995 Ward ............... F02P 3/0892
                                                  123/169 EL
5,715,801 A * 2/1998 Murasawa ............... F02P 3/02
                                                    123/642
2012/0097140 A1* 4/2012 Kusunoki ............... F02P 9/002
                                                      123/620
2013/0049593 A1 2/2013 Sugino et al.
2013/0208393 A1 8/2013 Hampton et al.
2013/0208394 A1 8/2013 Tanaya

OTHER PUBLICATIONS

Communication dated Dec. 9, 2014 from The Japanese Patent Office in counterpart Japanese Patent Application No. 2013-216943.

* cited by examiner

HIGH-FREQUENCY DISCHARGE IGNITION APPARATUS

BACKGROUND OF THE INVENTION

1. Field of the Invention

The present invention relates to a high-frequency discharge ignition apparatus that is utilized mainly in the operation of an internal combustion engine.

2. Description of the Related Art

In recent years, the issues such as environment preservation and fuel depletion have been raised; measures for these issues are urgently required also in the automobile industry. As an example of the measures, there exists a method in which the amount of fuel consumption is drastically improved through engine downsizing and engine weight-saving achieved by use of a supercharger.

It is known that in a high-supercharge mode, the pressure inside an engine combustion chamber becomes extremely high even when no combustion occurs and hence it is difficult in this situation to produce a spark discharge for starting combustion. One of the reasons for this is that the required voltage for causing a dielectric breakdown between the high-voltage electrode and the GND electrode of an ignition plug becomes extremely high and exceeds the withstanding voltage value of the insulating porcelain of an ignition plug. In order to solve this problem, a study for raising the withstanding voltage of insulating porcelain has been being made; however, because in the actual situation, it is difficult to secure a sufficient withstanding voltage for the requirement, a means for narrowing the gap of an ignition plug cannot help being carried out. However, when the gap of the ignition plug is narrowed, the extinguishing action by the electrodes becomes large in turn; thus, there is posed a problem that the startability and the combustion performance are deteriorated.

As a solution for this problem, an avoidance means is conceivable in which energy that exceeds the extinguishing action, i.e., the thermal energy absorbed by the electrodes is provided through spark discharge or combustion is caused at a place as remote from the electrodes as possible; for example, such an ignition apparatus as disclosed in Patent Document 1 has been proposed.

An ignition apparatus disclosed in Patent Document 1 makes it possible that a conventional ignition coil produces a spark discharge in an ignition plug GAP and a high-frequency current is made to flow into the path of the spark discharge by way of a mixer formed of a capacitor so that a high-energy spark discharge and discharge plasma that spreads wider than an ordinary spark discharge are produced.

[Patent Document 1] Japanese Patent Application Laid-Open No. 2012-112310

The conventional ignition apparatus disclosed in Patent Document 1 is a system in which a high-frequency current is made to flow into an ignition plug by way of a high-withstanding-voltage capacitor; however, it has a problem that depending on the kind of a used ignition plug and due to a change in the environment around the ignition plug at a time when a spark discharge is produced, the discharge-maintenance condition of the path for the ignition plug spark discharge changes and hence the high-frequency current cannot stably be applied.

SUMMARY OF THE INVENTION

The present invention has been implemented in order to solve the foregoing problem in the conventional apparatus; the objective thereof is to provide a high-frequency discharge ignition apparatus that can stably make a desired high-frequency current flow into a spark discharging path even when due to a change in a used ignition plug and due to a change in the environment around the ignition plug, the discharging condition of the spark discharge changes and that can efficiently form large discharge plasma.

A high-frequency discharge ignition apparatus according to the present invention is provided with an ignition plug that is provided with a hi voltage-side first electrode and a ground-side second electrode facing each other through a gap and produces a spark discharge in the gap so that an inflammable fuel-air mixture inside a combustion chamber of an internal combustion engine is ignited, a spark discharge path generation device that generates a high voltage and supplies the generated high voltage to the first electrode so as to form a spark discharge path in the gap, a voltage boosting device that boosts the voltage of an AC current, and a high-frequency current supply apparatus that supplies an AC current to the spark discharge path formed in the gap by way of the voltage boosting device. The voltage boosting device boosts an output voltage of the high-frequency current supply apparatus so that a high-frequency current can be made to flow into the ignition plug.

A high-frequency discharge ignition apparatus according to the present invention stably supplies a large AC discharge current into a space between the electrodes of an ignition plug, so that it is made possible that a high-energy discharge can efficiently be realized and hence large discharge plasma is formed; therefore, even when a small-gap ignition plug is utilized, neither the startability nor the combustion performance is deteriorated and hence the thermal efficiency can be raised by weight saving through high-supercharge downsizing or by increasing the compression ratio; thus, the fuel utilized for the operation of an internal combustion engine can drastically be reduced, whereby the carbon footprint can largely be decreased and hence the ignition apparatus can contribute to the environment preservation.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Embodiment 1

An high-frequency discharge ignition apparatus according to the present invention makes it possible that a high voltage generated by a spark discharge path generation device causes a spark discharge in the gap of an ignition plug and a large high-frequency current, the electric potential of which has been boosted, is made to flow into the spark discharge path so that large discharge plasma is formed in the gap of the ignition plug and hence a high-frequency current can stably be made to flow into the gap of th ignition plug.

Figure 3:
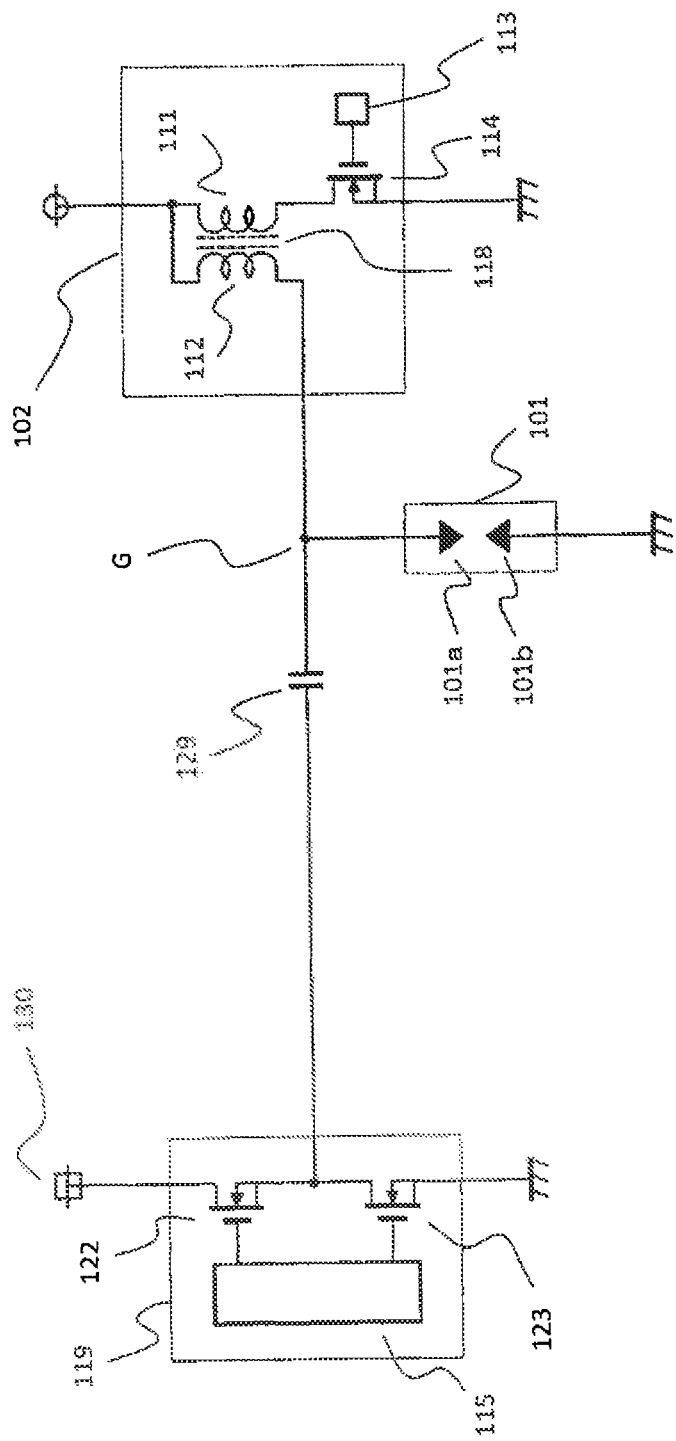
FIG. 3 is a configuration diagram illustrating a conventional ignition apparatus.

FIG. 3 illustrates the system of a conventional ignition apparatus utilizing a high-frequency power source; a high-frequency current is made to flow into the spark discharge path of an ignition plug 101 by way of a mixer formed of a capacitor C (129).

In order to make a high-frequency current stably flow into the spark discharge path, it is required to apply to the point G a voltage that is the same as or higher than the discharge maintaining voltage for a spark discharge in the ignition plug 101. The discharge maintaining voltage for a spark discharge in the ignition plug 101 varies depending on the kind of a utilized ignition plug or a change in the environment around the ignition plug at a time when a spark discharge occurs. Accordingly, in order to make a high-frequency current stably flow into the spark discharge path, the electric potential at the point G needs to be approximately 1000 V.

In the conventional ignition apparatus, in order to make the electric potential at the point G to be 1000 V, a high-frequency power source voltage 130 needs to be approximately 1000 V; therefore, a high-withstanding-voltage device is required for each of switching devices A (122) and B (123). When the withstanding voltages of the switching devices A (122) and B (123) are raised, there are posed such demerits as the loss in the device increases, the sizes of components are enlarged, and the costs of the devices increase. Moreover, the withstanding voltage of a device, among the present universal devices, that is capable of high-speed switching is lower than 1000 V; thus, in order to output a voltage that is the same as or higher than 1000 V, it is required to utilize a special customized device. Other circuit elements in FIG. 3 will be explained with reference to FIG.

Figure 1:
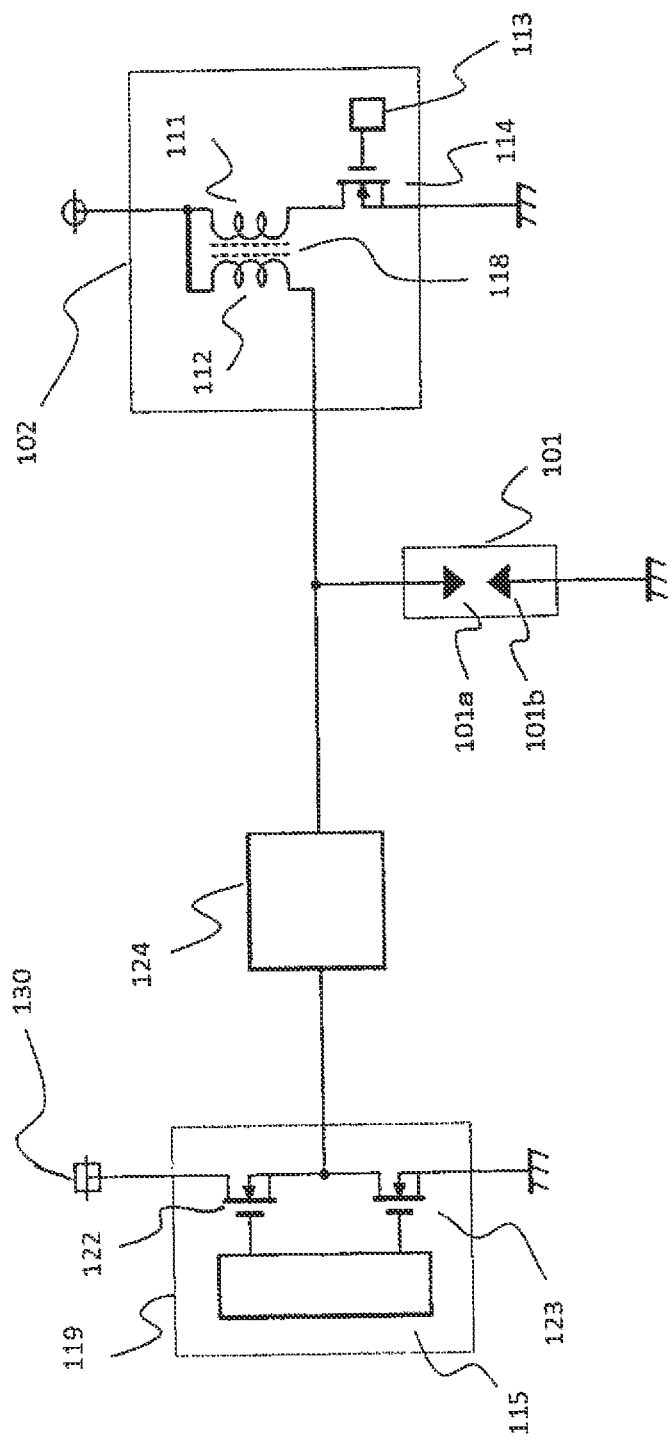
FIG. 1 is a configuration diagram illustrating a high-frequency discharge ignition apparatus according to Embodiment 1 of the present invention.

FIG. 1 is a configuration diagram illustrating a high-frequency discharge ignition apparatus, according to Embodiment 1 of the present invention, that solves this problem. In FIG. 1, the high-frequency discharge ignition apparatus is provided with an ignition plug 101, an ignition coil device 102 (spark discharge path generation device) that applies a predetermined high Voltage to the ignition plug 101 so as to form a spark discharge path, a high-frequency power source 119 that supplies a high-frequency current so as to form large discharge plasma in the spark discharge path, and a voltage boosting device 124 that boosts the output voltage of the high-frequency power source 119.

The ignition coil device 102 is provided with a primary coil 111 and a secondary coil 112 that are magnetically coupled with each other through a core 118, a switching device C (114) that controls energization of the primary coil 111, and a driving device A (113) for driving the switching devices C (114). The ignition coil device 102, i.e., the spark discharge path generation device is to generate a high voltage, for example, several tens kilovolts; however, another type of circuit may be utilized as long as it generates a high voltage.

The high-frequency power source (high-frequency current supply apparatus) 119 is provided with switching devices A (122) and B (123) for generating a high-frequency current, and a driving device B (115) for driving the switching devices A (12) and B (3). The driving device B (115) turns off the switching device B (123) when the switching device A (122) is on and turns on the switching device B (123) when the switching device A (122) is off; for example, the control is performed at an on/off frequency of 4 MHz.

The ignition plug 101 is provided with a high-voltage electrode 101a, as a first electrode; a ground-side external electrode 101b, as a second electrode, that faces the high-voltage electrode 101a through a main plug gap, which is a predetermined gap. Because of the effect of the voltage boosting device 124, the output voltage of the high-frequency power source 119 can be boosted; therefore, the high-frequency power source voltage 130 can be lowered to a DC voltage, for example, approximately between 80 V to 200 V. As a result, as the device for high-frequency power source 119, a universal and inexpensive device can be utilized.

Figure 2:
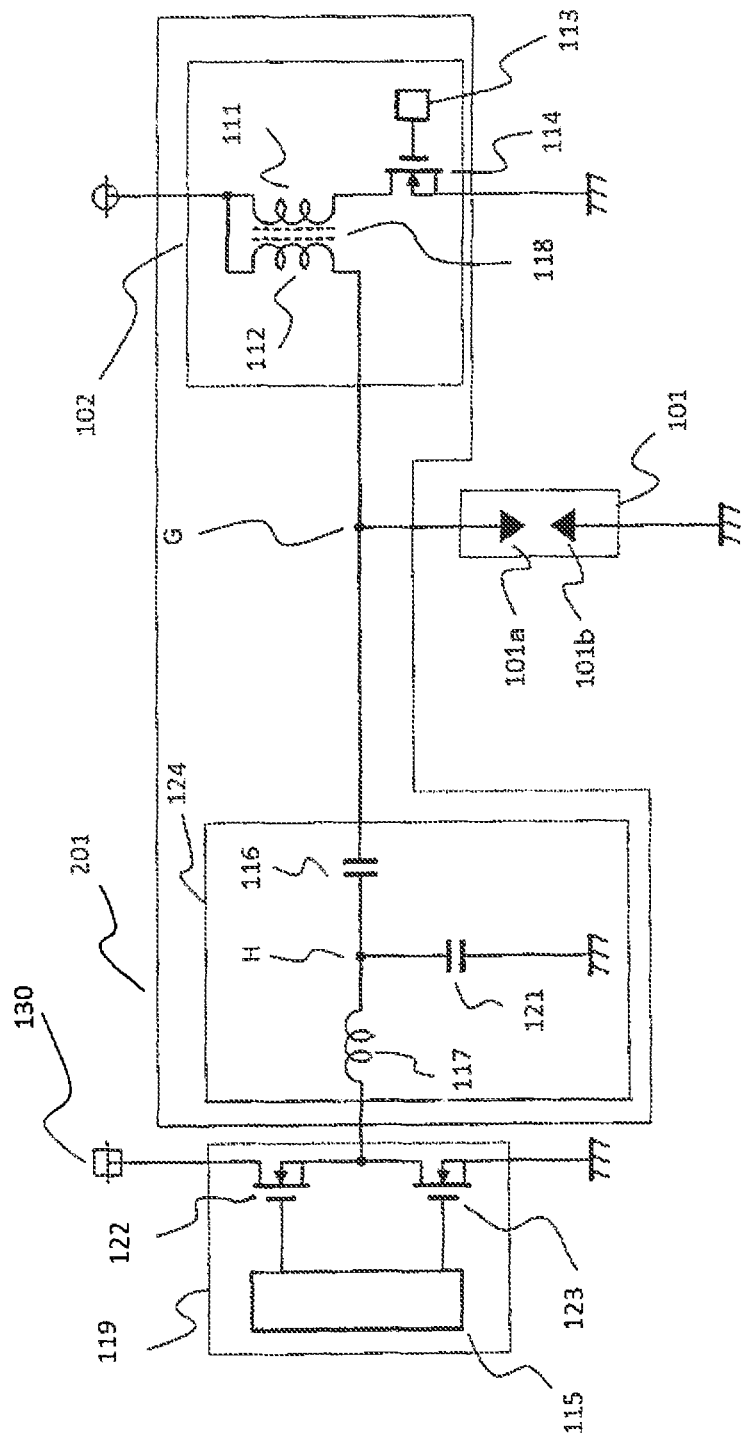
FIG. 2 is a configuration diagram of the high-frequency discharge ignition apparatus and illustrates the circuit configuration of a voltage boosting device in FIG. 1.

A configuration example of more specific high-frequency discharge ignition apparatus will be explained with reference to FIG. 2. FIG. 2 is a configuration diagram of a high-frequency discharge ignition apparatus in which the voltage boosting device 124 in FIG. 1 is formed of a resonance circuit including a capacitor and an inductor. The resonance circuit includes an inductor 114, a capacitor A (116), and a capacitor B (121); one end of the capacitor B (121) is connected with the connection point between the inductor 117 and the capacitor A (116) and the other end thereof is connected to the ground.

Through a resonance phenomenon, which is insusceptible to the discharge-maintaining condition of the ignition plug 101, in the path including the capacitor B (121) and the inductor 117, the voltage at the point H is boosted up to approximately 1000 V, and then the voltage is applied to the ignition plug 101 by way of the capacitor A (116); therefore, because a high voltage can applied to the ignition plug 101, a high-frequency current can stably be made to flow into the path of a spark discharge. The same effect can also be obtained by a configuration in which an inductor is disposed either at the prestage or at the poststage of the capacitor A (116). The voltage boosting device 124 and the ignition coil device 102 may preferably be disposed in a single and the same package in order to downsize the system and to raise the efficiency.

The capacitance of the capacitor A (116) to be connected with a high-voltage electrode 101a of the ignition plug 101 may preferably be set to a value the same as or smaller than 50 PF. The capacitor A (116) is charged with an induction current, which is the output of the ignition coil device 102; therefore, when the capacitance thereof is set to a too large value, the foregoing inductive current may prevent the capacitor A (116) from being charged up to the dielectric breakdown voltage of the gap of the ignition plug 101 and hence no spark discharge path may be formed. In order to reduce the current that flows into the capacitor B (121) so as to increase the current that flows into the ignition plug 101, the capacitance of the capacitor B (121) may preferably be set to a value the same as or smaller than 50 PF.

The resonance frequency of the resonance circuit included in the voltage boosting device 124 may preferably be set to a frequency the same as or lower than 4 MHz. That is because the operation limit frequency of a high-reliability and inexpensive universal switching device is approximately 4 MHz. Therefore, that is because the resonance frequency needs to be the same as or lower than 4 MHz in order to realize the high-frequency power source 119 by use of a high-reliability and inexpensive universal switching device.

In the high-frequency discharge ignition apparatus configured in such a manner as described above, the driving device A (113) and the driving device B (115) are connected with an operation control unit that controls the operation of an internal combustion engine, and based on control signals outputted from the operation control unit, the ignition is controlled in accordance with the operation condition of internal combustion engine. When a control signal is inputted to the driving device A (113), generated high voltage is applied to the ignition plug 101 and then a discharging path is created in the ignition plug 101. After that, for example, in 50 μsec after the control signal has been applied to the driving device A (113), a control signal is applied to the driving device B (115); a high-frequency current generated by the high frequency power source 119 flows into the ignition plug 101 by way of the voltage boosting device 124; then, discharge plasma is formed in the ignition plug 101.

A high voltage generated by the ignition coil device (spark discharge path generation device) 102 is supplied, to the first electrode of the ignition plug 101 without passing through the voltage boosting device 124; therefore, the whole circuit configuration is simplified.

As the ignition plug 101 utilized in Embodiment 1, a plasma jet plug may be utilized that is configured in such a way that plasma produced by a discharge in a cavity formed between the first electrode 101*a* and the second electrode 101*b* is ejected to the outside from an orifice provided in the second electrode.

When the distance between the first electrode 101*a* and the second electrode 101*b* is set to 1 mm or smaller, the discharge maintaining voltage at a time when a spark discharge path is being generated can be lowered and hence a high-frequency current can more stably be made to flow into the ignition plug 101.

As described above, Embodiment 1 of the present invention makes it possible to make a high-frequency current stably flow into the ignition plug, so that large discharge plasma can efficiently be formed; therefore, the fuel utilized for the operation of an internal combustion engine can drastically be reduced, whereby the carbon footprint can largely be decreased and hence the ignition apparatus can contribute to the environment preservation.

A high-frequency discharge ignition apparatus according to the present invention is mounted in an automobile, a motorcycle, an outboard engine, an extra machine, or the like utilizing an internal combustion engine, and is capable of securely igniting a fuel; therefore, the high-frequency discharge ignition apparatus makes it possible to effectively operate the internal combustion engine, and hence contributes to the environment preservation and to the solution of the problem of fuel depletion.

In the scope of the present invention, the embodiments thereof can appropriately be modified or omitted.

What is claimed is:

1. An ignition apparatus comprising:
an ignition plug that is provided with a first electrode and a second electrode facing each other through a gap and produces a spark discharge in the gap so that an inflammable fuel-air mixture inside a combustion chamber of an internal combustion engine is ignited;
a spark discharge path generation device that generates a high voltage and supplies the generated high voltage to the first electrode so as to form a spark discharge path in the gap;
a voltage boosting device that boosts a voltage of an AC current; and
a high-frequency current supply apparatus that supplies an AC current to the spark discharge path formed in the gap via the voltage boosting device,
wherein the voltage boosting device is configured with an inductor connected with the output of the high-frequency current supply apparatus, a capacitor B that is connected between the inductor and the ground having the same electric potential as the second electrode of the ignition plug and that configures a resonance circuit along with the inductor, and a capacitor A that is connected between the inductor and the first electrode of the ignition plug, and boosts an output voltage of the high-frequency current supply apparatus so that a high-frequency current can be made to flow into the ignition plug.

2. The ignition apparatus according to claim 1, wherein the voltage boosting device and the spark discharge path generation device are arranged in a single and the same package.

3. The ignition apparatus according to claim 1, wherein the capacitor A has a capacitance value of 50 pF or smaller.

4. The ignition apparatus according to claim 1, wherein the capacitor B has a capacitance value of 50 pF or smaller.

5. The particle beam irradiation apparatus according to claim 1, wherein the voltage boosting device has a resonance frequency of 4 MHz or lower.

6. The ignition apparatus according to claim 1, wherein the spacing of the gap between the first electrode and the second electrode of the ignition plug is set to 1 mm or smaller.

* * * * *